(12) United States Patent
Nishimura et al.

(10) Patent No.: US 7,554,212 B2
(45) Date of Patent: Jun. 30, 2009

(54) MECHANICALLY POWERED CORDLESS POINTING DEVICE

(75) Inventors: Ken A. Nishimura, Fremont, CA (US); Julie E. Fouquet, Portola Valley, CA (US); George Panotopoulos, Santa Clara, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 11/512,587

(22) Filed: Aug. 30, 2006

(65) Prior Publication Data

US 2008/0055249 A1    Mar. 6, 2008

(51) Int. Cl.
 *G09G 5/08* (2006.01)
(52) U.S. Cl. ..................................... 290/1 E
(58) Field of Classification Search ............ 290/1 E
 See application file for complete search history.

(56) References Cited

U.S. PATENT DOCUMENTS

| | | | |
|---|---|---|---|
| 5,630,155 A * | 5/1997 | Karaki et al. | 713/340 |
| 5,963,145 A | 10/1999 | Escobosa | |
| 6,327,484 B1 | 12/2001 | Mathew | |
| 6,529,067 B2 | 3/2003 | Uen et al. | |
| 6,768,216 B1 * | 7/2004 | Carroll et al. | 290/42 |
| 6,774,502 B2 * | 8/2004 | Dietz et al. | 290/1 R |
| 6,868,433 B1 | 3/2005 | Philyaw | |
| 6,903,725 B2 * | 6/2005 | Nacson | 345/163 |
| 7,158,116 B2 * | 1/2007 | Poltorak | 345/158 |
| 7,180,503 B2 * | 2/2007 | Burr et al. | 345/163 |
| 7,211,986 B1 * | 5/2007 | Flowerdew et al. | 320/108 |
| 2003/0067171 A1 * | 4/2003 | Liao | 290/1 E |
| 2004/0119693 A1 * | 6/2004 | Kaemmler | 345/163 |
| 2007/0188454 A1 * | 8/2007 | O'Sullivan et al. | 345/163 |

FOREIGN PATENT DOCUMENTS

| | | | |
|---|---|---|---|
| EP | 775967 A1 * | 5/1977 | |
| JP | 06332615 A * | 12/1994 | |
| JP | 07225649 A * | 8/1995 | |
| JP | 10049297 A * | 2/1998 | |
| JP | 2003233459 A * | 8/2003 | |

* cited by examiner

*Primary Examiner*—Joseph Waks

(57) ABSTRACT

A computer peripheral system includes a computer peripheral and a mechanical input device adapted to initiate a conversion of mechanical energy to electrical energy. The computer peripheral includes an energy conversion device adapted to convert mechanical energy to electrical energy. The converted electrical energy provides power to at least one computer peripheral component.

20 Claims, 9 Drawing Sheets

MECHANICALLY POWERED CORDLESS POINTING DEVICE

BACKGROUND

Computer peripherals such as computer peripheral input devices, are well known in the industry. A computer mouse is a computer peripheral input device. The cursor technology for the computer mouse has evolved to include computer peripheral input devices that operate wirelessly. Such devices include self-contained power sources such as chemical batteries to store energy for operation of the computer peripheral input devices.

The power sources can be primary batteries that need to be replaced when the power is drained from them. The user of the computer peripheral must have spare batteries available to replace the drained batteries to continue to operate the computer peripheral.

The power sources can also be secondary batteries that require recharging in a charging unit on a regular basis. If the secondary battery is not recharged before it is drained of power, the user of the computer peripheral input device must recharge the drained secondary battery in the charging unit until the battery is sufficiently charged to run the computer peripheral input device and/or replace the discharged secondary battery with another secondary battery. In some cases it takes a few hours to recharge the battery. Moreover, recharging of the secondary battery requires a power source which may not be conveniently available. If the user of the computer peripheral is traveling, the user must bring the charging unit on the trip or use the computer peripheral sparingly to avoid draining the secondary battery.

It is desirable to have a supplemental power source available in the computer peripheral input device that does not require traveling with primary batteries and/or charging units for secondary batteries. It is also desirable to have a primary power source that is independent of batteries that require replacement or recharging.

SUMMARY

One aspect of the present invention provides a computer peripheral system comprising a computer peripheral and a mechanical input device adapted to initiate a conversion of mechanical energy to electrical energy. The computer peripheral includes an energy conversion device adapted to convert mechanical energy to electrical energy. The converted electrical energy provides power to at least one computer peripheral component.

Another aspect of the present invention provides a mechanically powered computer peripheral including a mechanical energy storage device adapted to store mechanical energy and an energy conversion device adapted to release the stored mechanical energy as electrical energy. The released electrical energy is used to power the computer peripheral.

Yet another aspect of the present invention provides a system to provide mechanically generated electrical power to a computer peripheral. The system includes means for inputting mechanical energy, means for converting the mechanical energy to electrical energy and means for providing the electrical energy to a computer peripheral.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
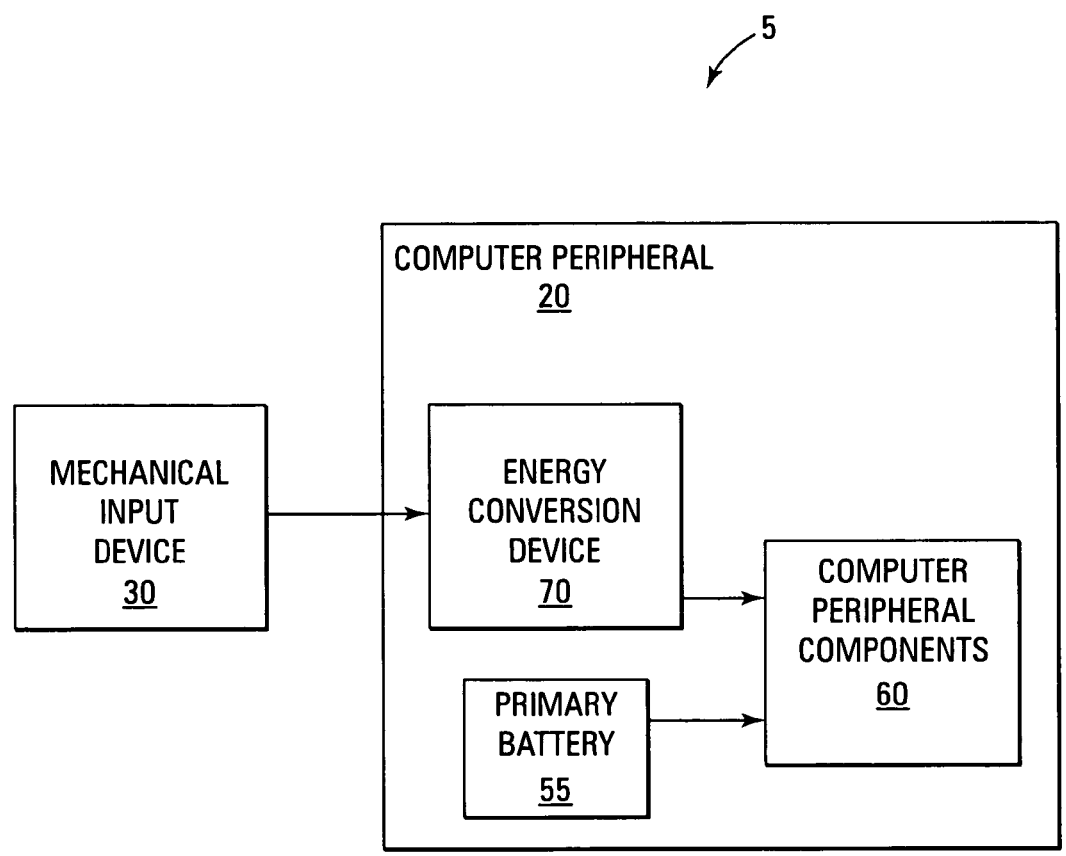
FIG. 1 is a block diagram representative of one embodiment of a mechanically powered computer peripheral.

FIG. 1 is a block diagram representative of one embodiment of a mechanically powered computer peripheral system 5. The mechanically powered computer peripheral system 5 includes a mechanically powered computer peripheral 20 and a mechanical input device 30. The mechanically powered computer peripheral 20, also referred to here as "computer peripheral 20," includes an energy conversion device 70, at least one computer peripheral component 60, and a primary battery 55.

The computer peripheral components 60 require electrical energy in order to operate. The primary battery 55 is electrically coupled to the computer peripheral components 60 and provides the required power as long as the primary battery 55 has sufficient voltage to drive the computer peripheral components 60. If the primary battery 55 is drained and is no longer able to provide the computer peripheral components 60 with the required operational power, the user of the computer peripheral 20 inputs mechanical energy to the computer peripheral 20 via the mechanical input device 30. The energy conversion device 70 converts the mechanical energy to electrical energy, and the converted electrical energy provides power to at least one computer peripheral component 60.

In one implementation of this embodiment, the computer peripheral component 60 includes a processor to execute software in the mechanically powered computer peripheral 20. In another implementation of this embodiment, the computer peripheral component 60 includes electro-optical devices required for the operation of the mechanically powered computer peripheral 20. In yet another implementation of this embodiment, the computer peripheral component 60 includes a wireless transceiver to send and receive wireless signals required for the operation of the mechanically powered computer peripheral 20.

The mechanical input device 30 is mechanically coupled to the energy conversion device 70. The mechanical input device 30 inputs mechanical energy to the energy conversion device 70. The energy conversion device 70 converts the input mechanical energy to electrical energy and the electrical energy is provided to power at least one computer peripheral component 60 in the computer peripheral 20.

In one implementation of this embodiment, the computer peripheral 20 includes a housing to enclose the energy conversion device 70, and the primary battery 55. In another implementation of this embodiment, the computer peripheral 20 includes a housing to enclose the energy conversion device 70, the primary battery 55 and the computer peripheral components 60.

The mechanical input device 30 can be a pull string coupled to a flywheel, a pull string coupled to a mainspring, a geared pull cord coupled to the flywheel, one or more handles, a key, a key to wind the mainspring, the key to rotate a gear, the key to advance a ratchet, the ratchet and combinations thereof. In one implementation of this embodiment, the primary battery 55 is not included in the computer peripheral and the computer peripheral is only powered by the converted mechanical energy.

Figure 2:
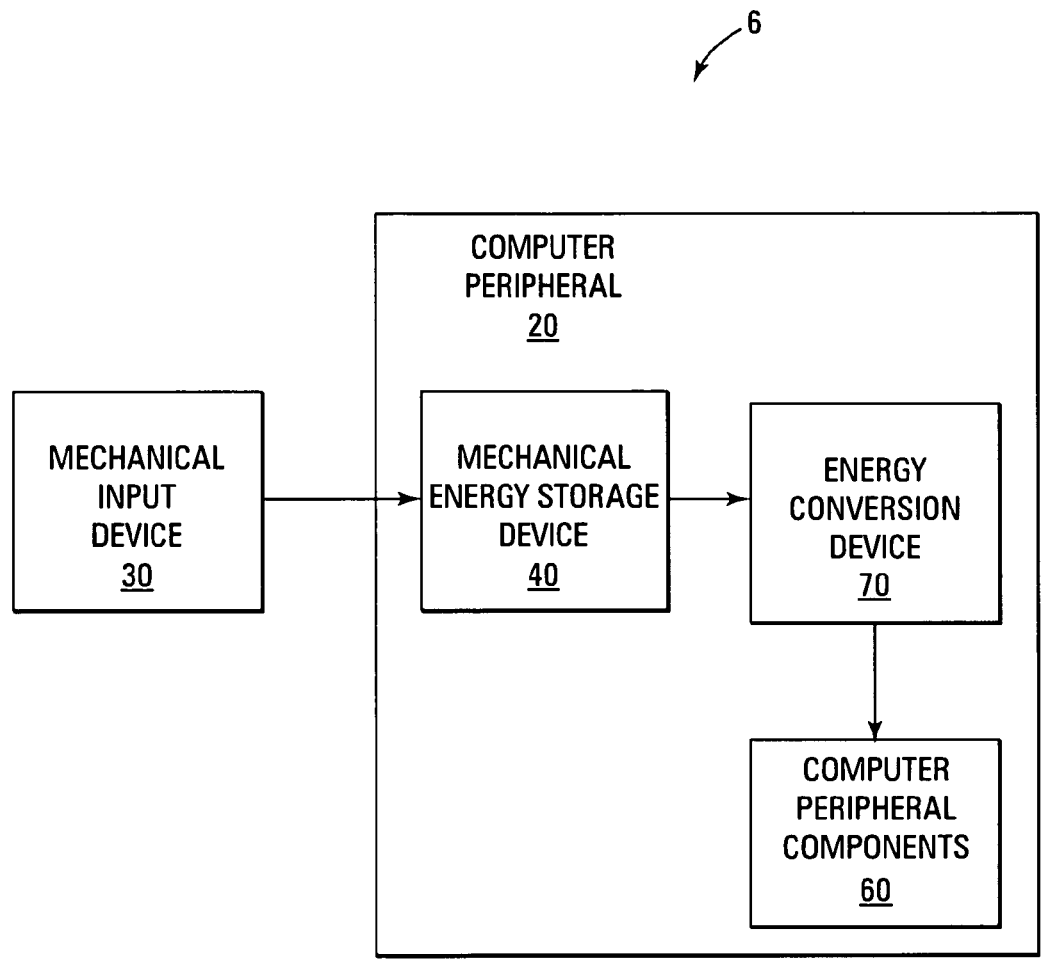
FIG. 2 is a block diagram representative of one embodiment of a mechanically powered computer peripheral.

FIG. 2 is a block diagram representative of one embodiment of a mechanically powered computer peripheral system 6. The mechanically powered computer peripheral system 6 includes a mechanically powered computer peripheral 20 and a mechanical input device 30. The mechanically powered computer peripheral 20 includes a mechanical energy storage device 40, an energy conversion device 70, and at least one computer peripheral component 60.

The mechanical input device 30 is mechanically coupled to the mechanical energy storage device 40. The energy conversion device 70 is coupled to the mechanical energy storage device 40 and the computer peripheral component 60. The mechanical energy input from the mechanical input device 30 is stored in the mechanical energy storage device 40. The stored mechanical is released to provide power to at least one computer peripheral component 60 responsive to the energy conversion device 70 initiating the conversion of the mechanical energy to electrical energy.

The mechanical input device 30 can be a pull string coupled to a flywheel, a pull string coupled to a mainspring, a geared pull cord coupled to the flywheel, one or more handles, a key, a key to wind the mainspring, the key to rotate a gear, the key to advance a ratchet, the ratchet and combinations thereof. The mechanical energy storage device can be at least one mainspring, at least one flywheel, at least one mechanical bearing that retains a magnetization, a weight, and combinations thereof.

In one implementation of this embodiment, the computer peripheral 20 includes at least one primary battery, such a primary battery 55 (FIG. 1). In another implementation of this embodiment, the computer peripheral 20 includes a housing to enclose the mechanical energy storage device 40 and the energy conversion device 70. In yet another implementation of this embodiment, the computer peripheral 20 includes a housing to enclose the mechanical energy storage device 40, the energy conversion device 70 and the computer peripheral components 60.

Figure 3:
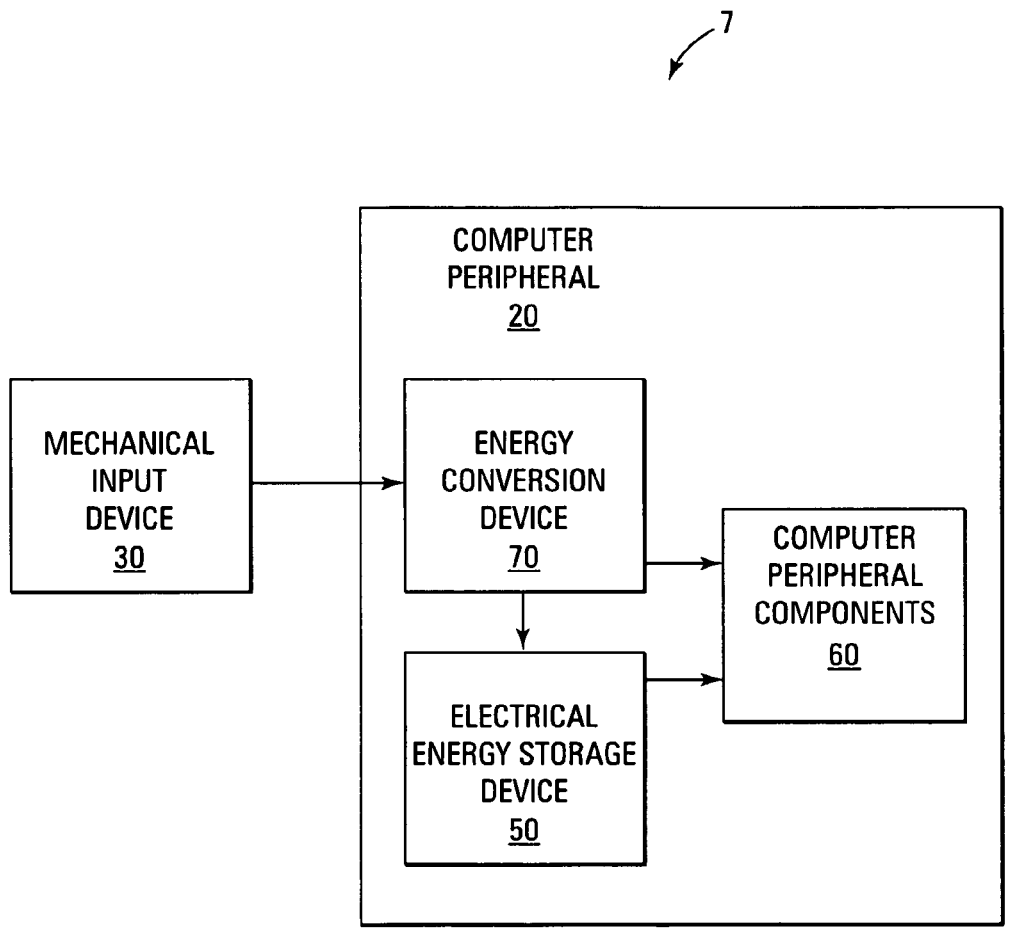
FIG. 3 is a block diagram representative of one embodiment of a mechanically powered computer peripheral.

FIG. 3 is a block diagram representative of one embodiment of a mechanically powered computer peripheral system 7. The mechanically powered computer peripheral system 7 includes a mechanically powered computer peripheral 20 and a mechanical input device 30. The mechanically powered computer peripheral 20 includes an electrical energy storage device 50, an energy conversion device 70, at least one computer peripheral component 60. The computer peripheral components 60 require electrical energy in order to operate. The energy conversion device 70 converts the mechanical energy to electrical energy, and the converted electrical energy provides power to at least one computer peripheral component 60 in the mechanically powered computer peripheral 20.

The mechanical input device 30 is mechanically coupled to the energy conversion device 70, so that the mechanical energy converted to electrical energy. The energy conversion device 70 is coupled to the electrical energy storage device 50 and the computer peripheral components 60. The electrical energy storage device 50 is coupled to the computer peripheral components 60.

In one implementation of this embodiment, the energy conversion device 70 outputs the generated electrical power directly to the computer peripheral components 60. In another implementation of this embodiment, the energy conversion device 70 outputs energy to the electrical energy storage device 50. In yet another implementation of this embodiment, the energy conversion device 70 outputs any the required electrical energy to the computer peripheral components 60 and inputs the remainder of the generated electrical power to the electrical energy storage device 50 for use by the computer peripheral components 60 as required at a later time. In another implementation of this embodiment, there is no electrical energy storage device 50 in the computer peripheral 20.

The electrical energy storage device 50 can be a rechargeable battery, a capacitor, a super-capacitor, a bank of capacitors, a bank of rechargeable batteries, an inductor, a bank of inductors, and combinations thereof. The mechanical input device 30 can be a pull string coupled to a flywheel, a pull string coupled to a mainspring, a geared pull cord coupled to the flywheel, one or more handles, a key, a key to wind the mainspring, the key to rotate a gear, the key to advance a ratchet, the ratchet and combinations thereof.

In one implementation of this embodiment, a primary battery, such as primary battery 55 (FIG. 1) is electrically coupled to the computer peripheral components 60 and provides the required power as long as the primary battery has sufficient voltage to drive the computer peripheral components 60. In this case, if the primary battery is drained and is no longer able to provide the computer peripheral components 60 with the required operational power, the user of the computer peripheral 20 inputs mechanical energy to the computer peripheral 20 via the mechanical input device 30.

In one implementation of this embodiment, the computer peripheral 20 includes a housing to enclose the energy conversion device 70, and the electrical energy storage device 50. In another implementation of this embodiment, the computer peripheral 20 includes a housing to enclose the energy conversion device 70, the electrical energy storage device 50, and the computer peripheral components 60.

Figure 4:
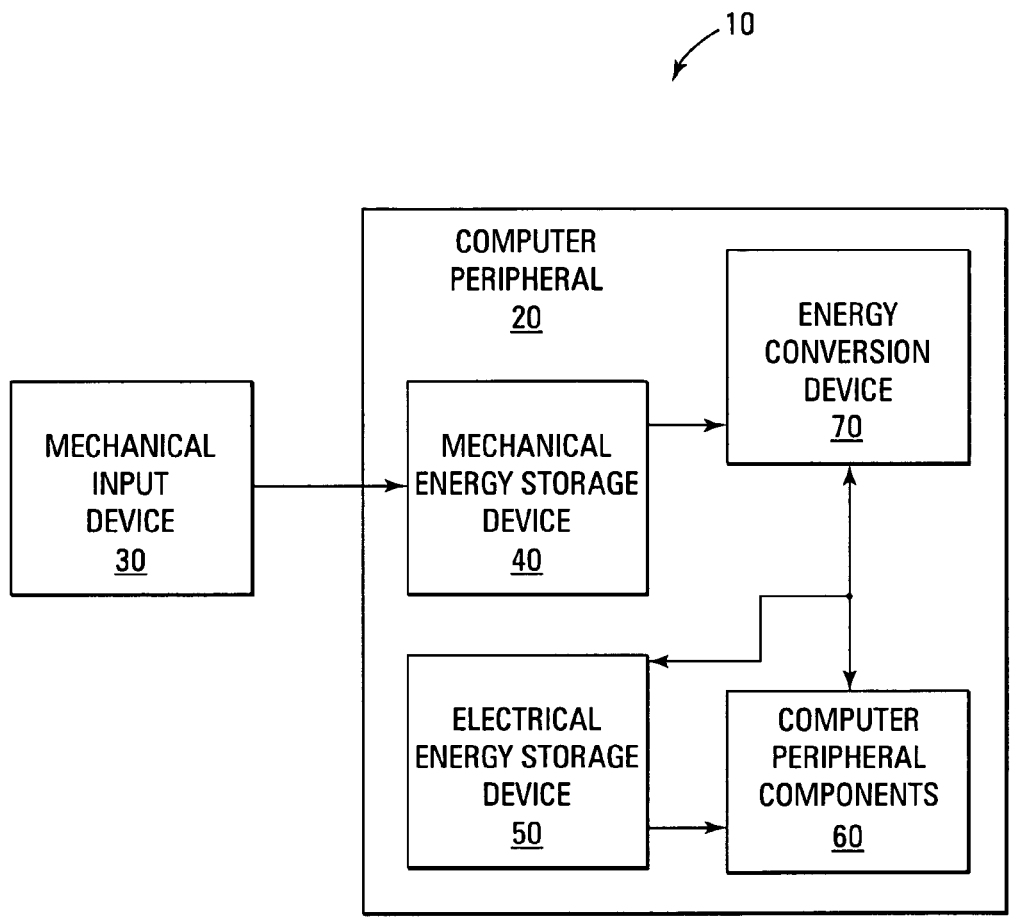
FIG. 4 is a block diagram representative of one embodiment of a mechanically powered computer peripheral.

FIG. 4 is a block diagram representative of one embodiment of a mechanically powered computer peripheral system 10. The mechanically powered computer peripheral system 10 includes a mechanically powered computer peripheral 20 and a mechanical input device 30. The mechanically powered computer peripheral 20 includes a mechanical energy storage device 40, an electrical energy storage device 50, an energy conversion device 70, and at least one computer peripheral component 60. The computer peripheral components 60 require electrical energy in order to operate.

The mechanical input device 30 is mechanically coupled to the mechanical energy storage device 40, so that the stored mechanical energy is released to provide power to at least one computer peripheral component 60 responsive to the mechanical input device 30 initiating the conversion of the mechanical energy to electrical energy. The mechanical input device 30 initiates a conversion of mechanical energy to electrical energy. The energy conversion device 70 completes the conversion of mechanical energy to electrical energy. The energy conversion device 70 is coupled to the mechanical energy storage device 40 and the computer peripheral component 60. The energy conversion device 70 outputs energy to the electrical energy storage device 50 and/or the computer peripheral component 60.

The electrical energy storage device 50 stores the electrical energy that is generated during the conversion of mechanical energy to electrical energy. The stored energy provides electrical power required to run the computer peripheral components 60 in the computer peripheral 20. Thus, the mechanically powered computer peripheral system 10 includes the mechanical energy storage device 40 to store mechanical energy, the energy conversion device 70 to convert mechanical energy to electrical energy, so that the electrical energy is provided to power the computer peripheral components 60 in the computer peripheral 20. In one implementation of this embodiment, the electrical energy is immediately provided to power the computer peripheral components 60 upon conversion. In another implementation of this embodiment, the electrical energy is released to provide power to the computer peripheral components 60 after temporary storage in the electrical energy storage device 50. In yet another implementation of this embodiment, the energy conversion device 70 outputs any the required electrical energy to the computer peripheral components 60 and inputs the remainder of the generated electrical power to the electrical energy storage device 50 for use by the computer peripheral components 60 as required at a later time.

In one implementation of this embodiment, the computer peripheral 20 includes a housing to enclose the mechanical energy storage device 40 and the electrical energy storage device 50. In another implementation of this embodiment, the computer peripheral 20 includes a housing to enclose the mechanical energy storage device 40 and the electrical energy storage device 50, and the energy conversion device 70. In yet another implementation of this embodiment, the computer peripheral 20 includes a housing to enclose the mechanical energy storage device 40, the energy conversion device 70, the electrical energy storage device 50, and the computer peripheral components 60.

The electrical energy storage device 50 can be a rechargeable battery, a capacitor, a super-capacitor, a plurality of capacitors, a plurality of rechargeable batteries and combinations thereof. The mechanical input device 30 can be a pull string coupled to a flywheel, a pull string coupled to a mainspring, a geared pull cord coupled to the flywheel, one or more handles, a key, a key to wind the mainspring, the key to rotate a gear, the key to advance a ratchet, the ratchet and combinations thereof.

In one implementation of this embodiment, a primary battery is electrically coupled to the computer peripheral components 60 and provides the required power as long as the primary battery has sufficient voltage to drive the computer peripheral components 60. If the primary battery is drained and no longer able to provide the computer peripheral components 60 with the required operational power, the user of the computer peripheral 20 inputs mechanical energy to the computer peripheral 20 via the mechanical input device 30 to initiate the conversion of mechanical energy to electrical energy.

Figure 5:
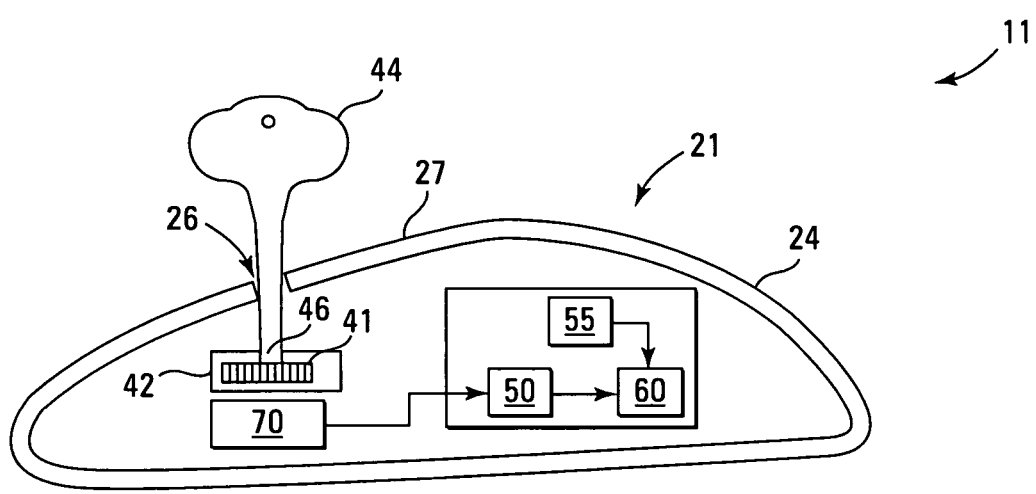
FIGS. 5-9 are diagrams representative of embodiments of mechanically powered computer peripheral systems.

FIG. 5 is a diagram representative of one embodiment of a mechanically powered computer peripheral system 11. In this implementation, the mechanical energy storage device 40 (FIG. 4) is at least one mainspring 41 positioned in a mainspring barrel 42 and the mechanical input device 30 (FIG. 4) is a key 44 that winds the mainspring 41 in order to initiate the conversion of the mechanical energy to electrical energy. In this embodiment, the computer peripheral 20 (FIG. 4) is a cordless mouse 21 that has a housing 24 to enclose the mainspring 41, the energy conversion device 70, the electrical energy storage device 50, the primary battery 55 and the computer peripheral components 60.

The housing 24 includes a hole 26 that extends through a surface 27 of the housing 24. The hole 26 receives the key 44. The end 46 of the key 44 fits through a hole in the mainspring barrel 42. When thus fitted, the key 44 is rotated in order to wind the mainspring 41. The mechanical input device 30, in this case the key 44, configures the mechanical energy storage device 40, in this case the mainspring 42, to store mechanical energy.

The wound mainspring 41 stores mechanical energy that is released as the mainspring 41 unwinds after the key 44 is released. The mainspring 41 is mechanically coupled to the energy conversion device 70. In one implementation of this embodiment, the energy conversion device 70 operates on the principle of electromagnetic induction. The energy conversion device 70 includes an electric conductor (not shown), such as a copper wire, that is moved through a magnetic field generated by magnets (not shown) in the energy conversion device 70 in response to the unwinding of the mainspring 41. An electric current flow is induced in the conductor. In this manner, the mechanical energy of the unwinding mainspring 44 is converted into the electric energy of the current that flows in the wire.

The energy conversion device 70 outputs the electrical energy to the electrically connected electrical energy storage device 50. In one implementation of this embodiment, the generated current is transferred from the energy conversion device 70 to the electrical energy storage device 50 via wire, trace lines or any other form of galvanic connection. In one implementation of this embodiment, the energy conversion device 70 outputs the electrical energy directly to the computer peripheral components 60. In that case, the generated current is transferred from the energy conversion device 70 to the computer peripheral components 60 via wire, trace lines or the like. In another implementation of this embodiment, the primary battery 55 is not included in the computer peripheral and the computer peripheral is only powered by the converted mechanical energy.

Figure 6:
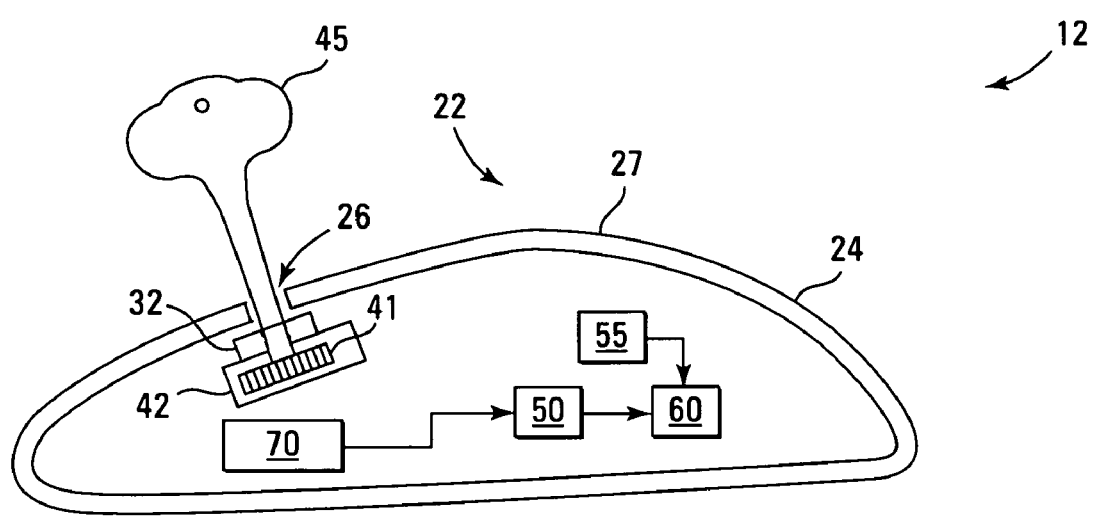

FIG. 6 is a diagram representative of one embodiment of a mechanically powered computer peripheral system 12. The mechanically powered computer peripheral system 12 includes a cordless mouse 22. The cordless mouse 22 differs from the cordless mouse 21 in that a gear 32 is mechanically coupled to the mainspring 41 and the key 45 rotates the gear 32 in order to initiate the conversion of the mechanical energy to electrical energy. In this case, the mechanical input device 30 is mechanically coupled to the mechanical energy storage device 40 via the gear 32.

When the key 45 rotates, the gear 32 rotates and the mechanically coupled mainspring 41 is wound up. Once the mainspring 41 is wound, the mechanical energy is released to operate the mouse 22 as described above with reference to FIG. 5. In one implementation of this embodiment, the primary battery 55 is not included in the computer peripheral and the computer peripheral is only powered by the converted mechanical energy.

Figure 7:
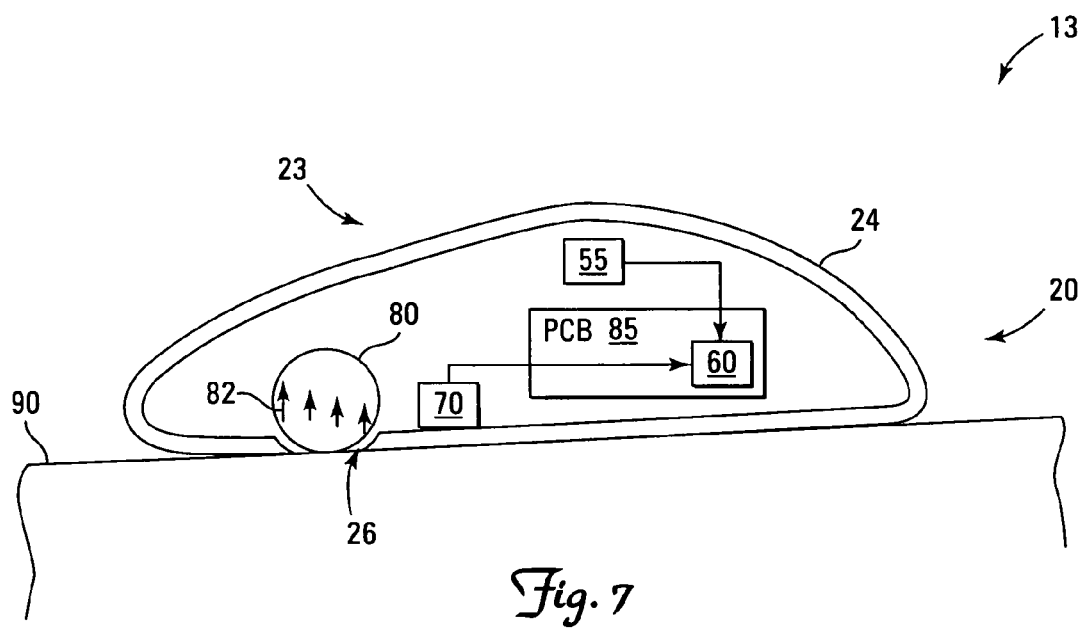

FIG. 7 is a diagram representative of one embodiment of a mechanically powered computer peripheral system 13. In the mechanically powered computer peripheral system 13, the computer peripheral 20 (FIG. 3) is a cordless mouse 23. In this implementation of the embodiment, the mechanical input device 30 (FIG. 3) is at least one mechanical bearing 80 that retains a magnetization 82. The mechanical bearing 80 is located within the cordless mouse 23. The mechanical bearing 80 extends through the hole 26 and contacts a surface 90 that is external to the cordless mouse 23. A rotation of the bearing 80 due to a relative motion between the bearing 80 and the external surface 90 changes a local magnetic field at the energy conversion device 70. The change in the local magnetic field at the energy conversion device 70 is converted to electrical energy. In this case, the energy conversion device 70 includes an electric conductor (not shown), such as a copper wire, in which current is generated as the magnetic field at the energy conversion device 70 fluctuates as the bearing 80 rotates.

In this manner, the mechanical energy of the rotation of the bearing 80 is converted into the electric energy of the current that flows in the conductor in the energy conversion device 70. The generated current is used to run the computer peripheral components 60 located on a printed circuit board 85 inside the housing 24 of the cordless mouse 23. In one implementation of this embodiment, the released electrical energy is temporarily stored in an electrical energy storage device, such as electrical energy storage device 50 in FIG. 3, before the energy is used to run the computer peripheral components 60. In another implementation of this embodiment, the mechanical energy of the rotation of the bearing 80 is converted into the electric energy to charge an electrical energy storage device, such as electrical energy storage device 50 in FIG. 3.

Figure 8:
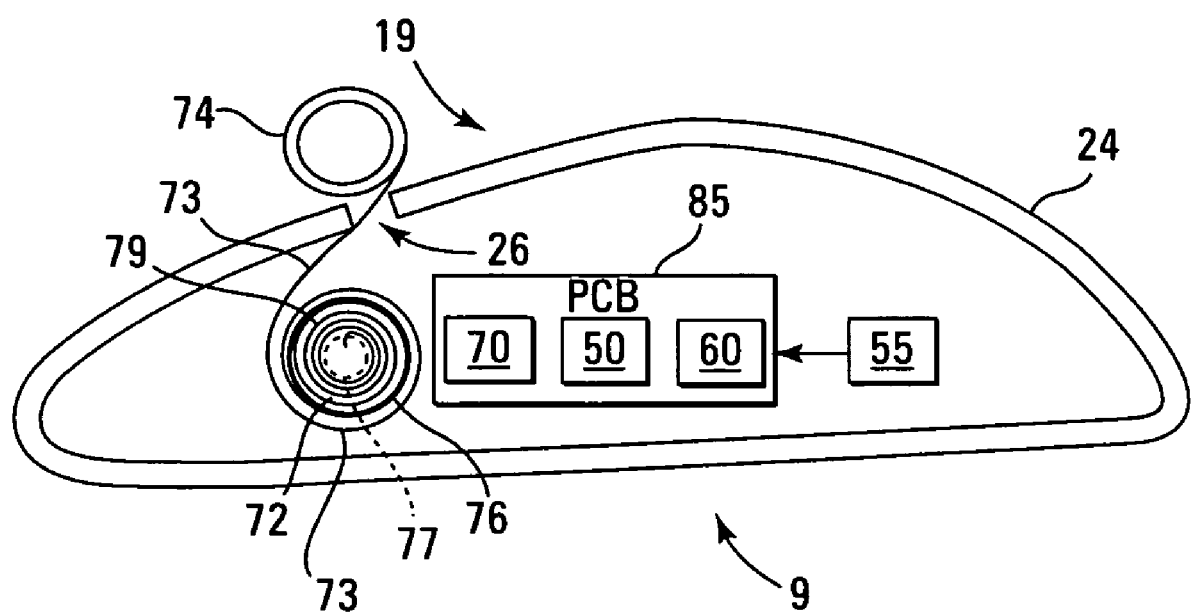

FIG. 8 is a diagram representative of one embodiment of a mechanically powered computer peripheral system 9. In this implementation, the mechanical energy storage device 40 (FIG. 4) is at least one flywheel 72 and the mechanical input device 30 (FIG. 4) is a pull string 73 attached to a handle 74. As shown in FIG. 8, the computer peripheral 20 (FIG. 4) is a cordless mouse 19 that has a housing 24 to enclose the flywheel 72, the energy conversion device 70, the electrical energy storage device 50, the primary battery 55, and the computer peripheral components 60. The energy conversion device 70, the electrical energy storage device 50 and the computer peripheral components 60 are located on a printed circuit board 85 in the housing 24.

The pull string 73 passes through the hole 26. The pull string 73 is attached to the flywheel 72 (visible behind the coil spring 79) at the end that is enclosed in the housing 24 of the cordless mouse 19. The pull string 73 is wound circumferentially around the rim 76. The pull string 73 is attached to the handle 74 at the end that is outside the housing 24. In order to initiate the conversion of the mechanical energy to electrical energy, the handle 74 is pulled away from the housing 24 so that the pull string 73, which was coiled around the rim 76, is extended through the hole 26. As the pull string 73 is extended, the flywheel 73 rotates about the axle 77. A coil spring 79 is operably attached to the pull string 73 to retract the pull string 73 after it is extended. In this manner the pull string 73 can be extended and retracted multiple times. In one implementation of this embodiment, the pull string 73, which is coiled around the axle 77, is extended through the hole 26, the flywheel 73 rotates about the axle 77.

Flywheels have the capacity to generate electric energy from the kinetic energy during the rotation of the flywheel. The structure and operation of flywheels is known in the art. In one implementation of this embodiment, the flywheel 72 includes a pair of counter-rotating flywheels that rotate within the housing 24. In one implementation of this embodiment, the flywheel 72 includes by bearings and/or self-restoring liquid bearing system. An energy conversion device 70, as described above with reference to FIG. 5 is coupled to the flywheel 72 so that the kinetic energy of the flywheel is converted to electrical energy.

In one implementation of this embodiment, the flywheel 72 is a component of the energy conversion device 70. In this embodiment, the flywheel 72 acts as the rotor of the energy conversion device 70 as well as the mechanical energy storage device 40. In an exemplary embodiment, the flywheel 72 includes a disk of substantial rotational inertia that retains a magnetization. In one implementation of this embodiment, the disk of the flywheel 72 is made of steel or other hard magnetic material with a permanent magnetization. In an alternative implementation of this embodiment, the disk of the flywheel 72 includes at least one permanent magnet on the surface or embedded in the disk. In another implementation of this embodiment, there is a direct coupling of a flywheel 72 to an electromagnetic generator.

Figure 9:
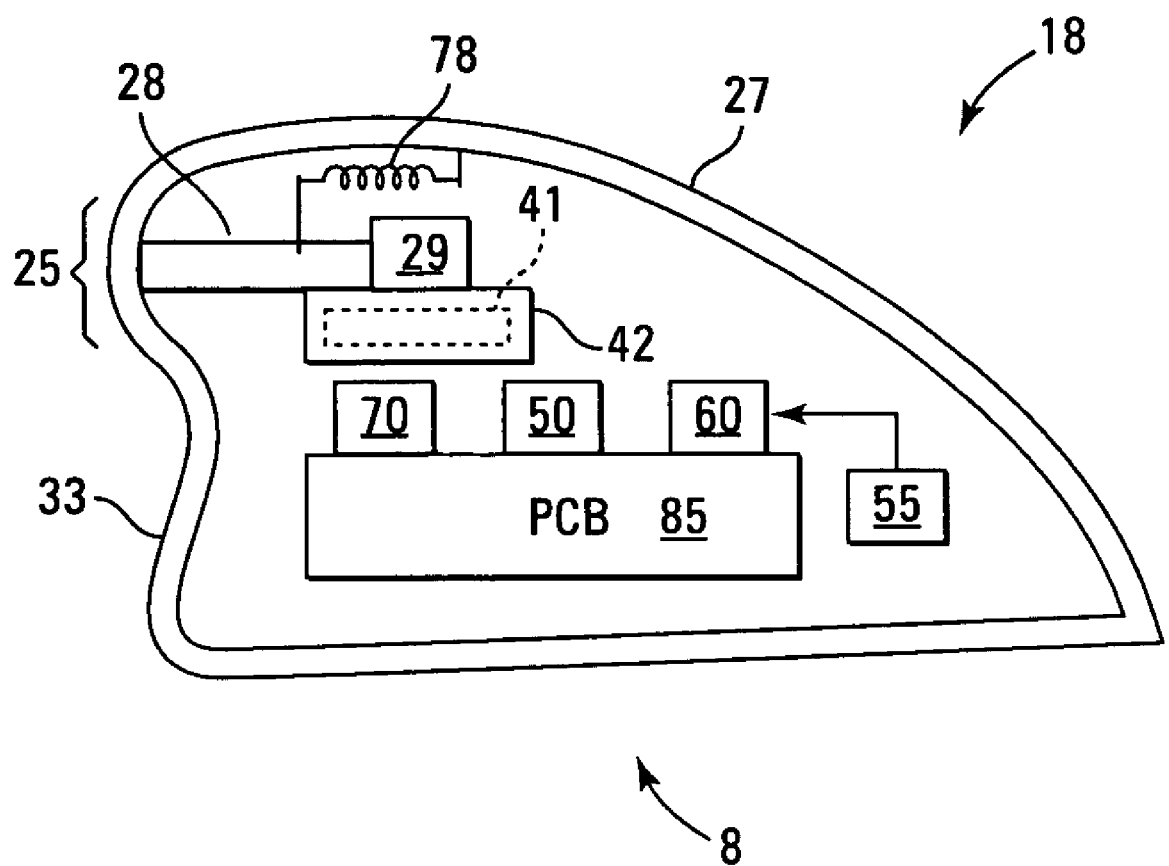

FIG. 9 is a diagram representative of one embodiment of a mechanically powered computer peripheral system 8. The mechanically powered computer peripheral system 8 includes a cordless mouse 18. The cordless mouse 18 differs from the cordless mouse 21 of FIG. 5 in that a ratchet 28 is mechanically coupled to a gear 29, which incrementally rotates the mainspring 41 in the mainspring barrel 42 as the ratchet is advanced to rotate the gear 29. The housing 33 of the cordless mouse 18 includes a pliable area 25 that is in contact with the ratchet 28. In order to provide mechanically generated electrical power to the cordless mouse 18, the user of the mouse 18 pushes on the pliable area 25 to increment the ratchet. With each push, the gear 29 is ratcheted by an increment. The mechanically coupled mainspring 41 in the mainspring barrel 42 is tightened with each increment of the ratchet 28. A spring 78 within the mechanism returns the pliable area 25 to its original position. Once the mainspring 41 is wound, the user disengages the ratchet 28 from the gear 29 and the mainspring 41 unwinds. The mechanical energy is released to operate the mouse 18 as described above with reference to FIG. 5. In this embodiment, the energy conversion device 70, the electrical energy storage device 50 and the computer peripheral components 60 are located on a printed circuit board 85 in the housing 33. The primary battery 55 is adjacent to the printed circuit board 85. In one implementation of this embodiment, the primary battery 55 is not included in the computer peripheral and the computer peripheral is only powered by the converted mechanical energy.

In this manner, mechanically powered computer peripheral systems 11, 12, 13, 9, and 8 provide mechanically generated electrical power to respective computer peripherals 21, 22, 23, 19, and 18. The computer peripherals 21, 22, 23, 19, and 18 receive an input of mechanical energy from a respective mechanical input device 44, 45, 82, 73, and 28, and the mechanical energy is converted to electrical energy by the energy conversion device 70 coupled to a respective mechanical energy storage device 41, 41, 82, 72, and 41. The converted electrical energy is provided to computer peripheral components 60 in the respective computer peripheral 21, 22, 23, 19, and 18. As described above, the mechanically powered computer peripheral systems 11, 12, 13, 9, and 8 store the electrical energy in the electrical energy storage device 50 within each system. As described above, the mechanically powered computer peripheral systems 11, 12, 13, 9, and 8 house the respective mechanical energy storage device 41, 41, 82, 72, and 41 and the electrical energy storage device 50 within the respective computer peripheral 21, 22, 23, 19, and 18.

In one implementation of this embodiment, the mechanical energy storage device comprises one of at least one mainspring, at least one flywheel, at least one mechanical bearing that retains a magnetization, a weight and combinations thereof. In one implementation of this embodiment, the mainspring, the flywheel and the mechanical bearing are each coupled to a separate generator. In another implementation of this embodiment, the mainspring, the flywheel and the mechanical bearing are each coupled to the same generator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A computer peripheral system, the system comprising: a computer peripheral; and
a mechanical input device adapted to initiate a conversion of mechanical energy to electrical energy, the computer peripheral including an energy conversion device adapted to convert mechanical energy to electrical energy, wherein the converted electrical energy provides power to at least one computer peripheral component, the mechanical input device comprising a manually displaceable ratchet mechanically coupled to a gear that is mechanically coupled to a mainspring such that the mainspring is incrementally rotated by the gear as the ratchet is advanced linearly to rotate the gear.

2. The system of claim 1, wherein the computer peripheral further comprises:
a mechanical energy storage device coupled to the mechanical input device and the energy conversion device, wherein the stored mechanical energy is released to provide power to the at least one computer peripheral component.

3. The system of claim 1, wherein the computer peripheral further comprises:
an electrical energy storage device is coupled to the energy conversion device and the at least one computer peripheral component, wherein the stored energy is released to provide power to the at least one computer peripheral component.

4. The system of claim 3, wherein the electrical energy storage device comprises at least one of a primary battery, a secondary battery, a capacitor, a super-capacitor, a plurality of capacitors, an inductor, a plurality of inductors, a plurality of batteries and combinations thereof.

5. The system of claim 1, further including:
a housing adapted to enclose the energy conversion device and the computer peripheral components, the housing including a pliable area that is in contact with the ratchet such that the pliable area of the housing can be pushed to advance the ratchet to rotate the gear.

6. The system of claim 5, wherein the housing includes:
at least one hole extending through a surface of the housing, the hole adapted to receive the mechanical input device, wherein the mechanical input device is mechanically coupled to a mechanical energy storage device.

7. The system of claim 1, wherein the computer peripheral is a cordless mouse.

8. The system of claim 1, wherein the mechanical input device further comprises a spring attached to the ratchet to return the ratchet to its original position after the ratchet has been advanced to rotate the gear.

9. A mechanically powered computer peripheral comprising:
a mechanical energy storage device adapted to store mechanical energy;
a mechanical input device adapted to configure the mechanical energy storage device to store mechanical energy, the mechanical input device comprising a manually displaceable ratchet mechanically coupled to a gear that is mechanically coupled to a mainspring such that the mainspring is incrementally rotated by the gear as the ratchet is advanced linearly to rotate the gear; and
an energy conversion device adapted to release the stored mechanical energy as electrical energy, wherein the released electrical energy is used to power the computer peripheral.

10. The computer peripheral of claim 9, wherein the mechanical input device is adapted to mechanically couple to the mechanical energy storage device.

11. The computer peripheral of claim 9, further comprising:
an electrical energy storage device adapted to store the released electrical energy and adapted to release the electrical energy stored in the electrical energy storage device.

12. The computer peripheral of claim 11, wherein the electrical energy storage device comprises a rechargeable battery, a capacitor, a super-capacitor, a bank of capacitors, a bank of rechargeable batteries, an inductor, a bank of inductors, and combinations thereof.

13. The computer peripheral of claim 9, wherein the computer peripheral is a cordless mouse.

14. The computer peripheral of claim 9, wherein the mechanical input device further comprises a spring attached to the ratchet to return the ratchet to its original position after the ratchet has been advanced to rotate the gear.

15. The computer peripheral of claim 9, further including:
a housing adapted to enclose the energy conversion device, the housing including a pliable area that is in contact with the ratchet such that the pliable area of the housing can be pushed to advance the ratchet to rotate the gear.

16. A system to provide mechanically generated electrical power to a computer peripheral, the system comprising:
means for inputting mechanical energy, the means for inputting comprising a manually displaceable ratchet mechanically coupled to a gear that is mechanically coupled to a mainspring such that the mainspring is incrementally rotated by the gear as the ratchet is advanced linearly to rotate the gear;
means for converting the mechanical energy to electrical energy; and
means for providing the electrical energy to a computer peripheral.

17. The system of claim 16, further comprising:
means for storing the electrical energy; and
means for housing the converting means and the storing means.

18. The system of claim 16, further comprising:
means for storing the mechanical energy; and
means for housing the converting means and the storing means.

19. The system of claim 16, wherein the means for inputting further comprises a spring attached to the ratchet to return the ratchet to its original position after the ratchet has been advanced to rotate the gear.

20. The system of claim 16, further including:
a housing adapted to enclose the means for converting, the housing including a pliable area that is in contact with the ratchet such that the pliable area of the housing can be pushed to advance the ratchet to rotate the gear.

* * * * *